(12) United States Patent
Westra et al.

(10) Patent No.: US 11,228,569 B2
(45) Date of Patent: Jan. 18, 2022

(54) SECURE TUNNELING FOR CONNECTED APPLICATION SECURITY

(71) Applicant: FORD GLOBAL TECHNOLOGIES, LLC, Dearborn, MI (US)

(72) Inventors: Michael Raymond Westra, Plymouth, MI (US); David Ray Erkkila, Brighton, MI (US); Elizabeth Halash, Warren, MI (US); Kevin Burdette, Plymouth, MI (US); Julius Marchwicki, Detroit, MI (US); Alan Daniel Gonzalez, Canton, MI (US); Chad Evert Esselink, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 676 days.

(21) Appl. No.: 15/057,474

(22) Filed: Mar. 1, 2016

(65) Prior Publication Data

US 2017/0257345 A1 Sep. 7, 2017

(51) Int. Cl.
*H04L 29/06* (2006.01)
*H04W 12/08* (2021.01)
*H04W 12/069* (2021.01)
*H04W 4/44* (2018.01)
*H04W 4/48* (2018.01)

(52) U.S. Cl.
CPC ........ *H04L 63/0428* (2013.01); *H04L 63/029* (2013.01); *H04L 63/0823* (2013.01); *H04W 12/069* (2021.01); *H04W 12/08* (2013.01); *H04W 4/44* (2018.02); *H04W 4/48* (2018.02)

(58) Field of Classification Search
CPC ...... G06F 13/385; G06F 3/167; G06F 21/121; G06Q 20/10; G06Q 20/327; G06Q 20/3278; G06Q 20/425; H01R 31/06; H04L 63/029; H04L 63/0823; H04L 63/0428; H04W 12/069; H04W 12/08; H04W 4/44; H04W 4/48
See application file for complete search history.

(56) References Cited

U.S. PATENT DOCUMENTS

| | | | |
|---|---|---|---|
| 8,954,605 B1 * | 2/2015 | Hecht | H04L 51/18 709/206 |
| 9,276,736 B2 * | 3/2016 | Peirce | H04L 9/0819 |
| 9,701,305 B2 * | 7/2017 | Paul | B60W 30/06 |

(Continued)

*Primary Examiner* — J. Brant Murphy
(74) *Attorney, Agent, or Firm* — Michael J. Spenner; Brooks Kushman P.C.

(57) ABSTRACT

A computing platform of a vehicle may receive a request, from a mobile application accessing a secure vehicle function, to create a secure tunnel between the computing platform and the mobile device; retrieve an application certificate from the mobile application; and validate the creation of the secure tunnel using the application certificate and a module certificate from a local policy table of the computing platform. A mobile device, connected to a computing platform of a vehicle may execute a mobile application requiring a secure vehicle function; send a request to create a secure tunnel with the computing platform responsive to access of by the mobile application of the secure vehicle function; and send to the computing platform an application certificate corresponding to the mobile application to validate creation of the secure tunnel.

23 Claims, 6 Drawing Sheets

(56) References Cited

U.S. PATENT DOCUMENTS

| | | | |
|---|---|---|---|
| 2004/0185842 A1* | 9/2004 | Spaur | B60R 25/04 |
| | | | 455/420 |
| 2009/0144540 A1* | 6/2009 | Davis | G06F 21/33 |
| | | | 713/156 |
| 2010/0191973 A1* | 7/2010 | Huntzicker | H04L 63/0823 |
| | | | 713/176 |
| 2011/0295444 A1* | 12/2011 | Westra | G06F 21/30 |
| | | | 701/1 |
| 2012/0190354 A1* | 7/2012 | Merrien | H04W 4/70 |
| | | | 455/422.1 |
| 2012/0254960 A1* | 10/2012 | Lortz | H04L 63/104 |
| | | | 726/7 |
| 2013/0031604 A1* | 1/2013 | Esselink | H04W 12/06 |
| | | | 726/3 |
| 2013/0099892 A1* | 4/2013 | Tucker | G07C 9/00309 |
| | | | 340/5.61 |
| 2014/0013109 A1* | 1/2014 | Yin | H04W 12/0608 |
| | | | 713/156 |
| 2014/0281503 A1* | 9/2014 | Mills | H04L 9/3263 |
| | | | 713/157 |
| 2015/0147974 A1* | 5/2015 | Tucker | G07C 9/00309 |
| | | | 455/41.2 |
| 2015/0149042 A1* | 5/2015 | Cooper | B60R 16/037 |
| | | | 701/48 |
| 2016/0037307 A1* | 2/2016 | Roth | H04W 4/046 |
| | | | 709/206 |
| 2016/0164881 A1* | 6/2016 | Bankowski | H04W 4/70 |
| | | | 726/4 |
| 2016/0352840 A1* | 12/2016 | Negron | H04L 67/16 |
| 2017/0203667 A1* | 7/2017 | He | B60L 11/1864 |

* cited by examiner

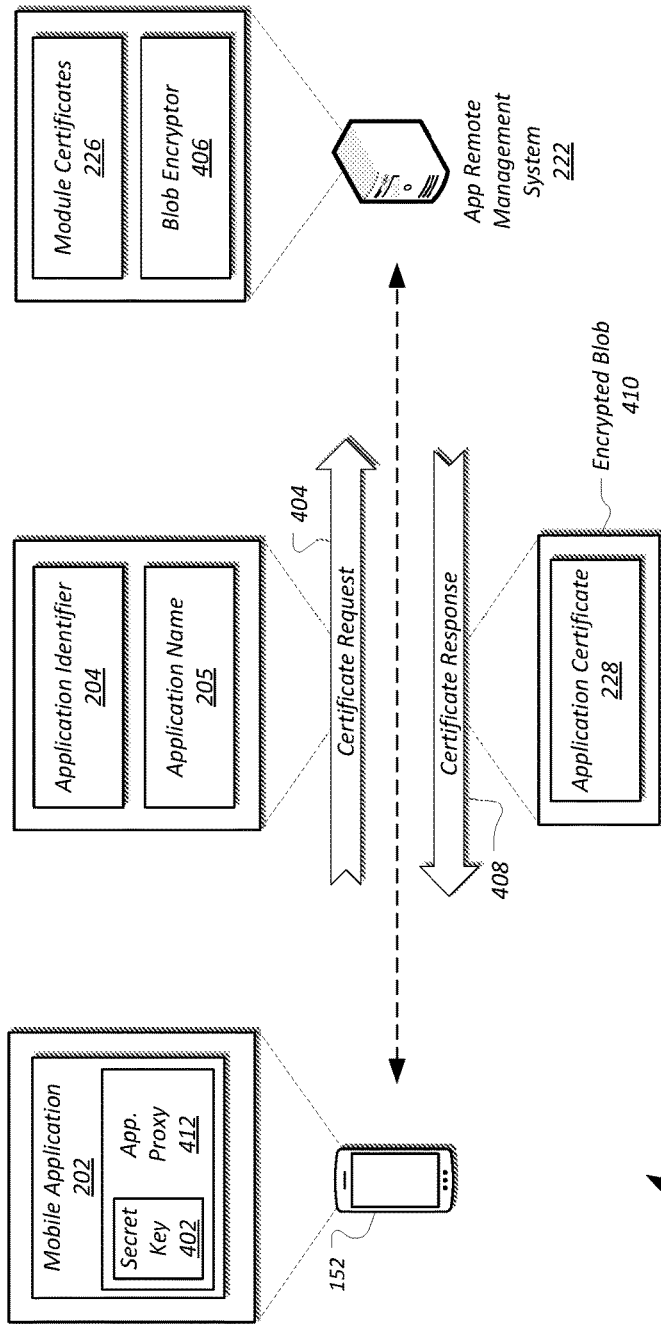

SECURE TUNNELING FOR CONNECTED APPLICATION SECURITY

TECHNICAL FIELD

Aspects of the disclosure generally relate to using a secure tunnel for connected application security.

BACKGROUND

A vehicle may allow for third-party mobile applications to integrate voice commands into the vehicle human-machine interface (HMI). By doing so, the third-party applications may be controllable via the HMI of the vehicle. However, some third-party applications may not be suitable for use when the vehicle is in motion, or may be restricted according to government regulations.

SUMMARY

In a first illustrative embodiment, a system includes a computing platform of a vehicle programmed to receive a request, from a mobile device executing a mobile application accessing a secure function, to create a secure tunnel between the computing platform and the mobile device; retrieve an application certificate from the mobile application; and validate creation of the secure tunnel using the application certificate and a module certificate stored to a local policy table of the computing platform.

In a second illustrative embodiment, a system includes a mobile device, connected to a computing platform of a vehicle, programmed to execute a mobile application requiring a secure function; send a request to create a secure tunnel with the computing platform responsive to access of by the mobile application of the secure function; and send to the computing platform an application certificate corresponding to the mobile application to validate creation of the secure tunnel.

In a third illustrative embodiment, a method includes sending, by a mobile device connected to a computing platform, a request to create a secure tunnel with the computing platform to execute a mobile application requiring a secure function; and receiving validation of the secure tunnel with the computing platform performed using an application certificate stored to mobile device and a module certificate stored to a local policy table of the computing platform.

BRIEF DESCRIPTION OF THE DRAWINGS

FIG. 3 illustrates an example diagram of a mobile application executed by the mobile device utilizing a secure tunnel with the computing platform of the vehicle;

FIG. 4 illustrates an example diagram of a mobile application requesting an application certificate;

DETAILED DESCRIPTION

Figure 1:
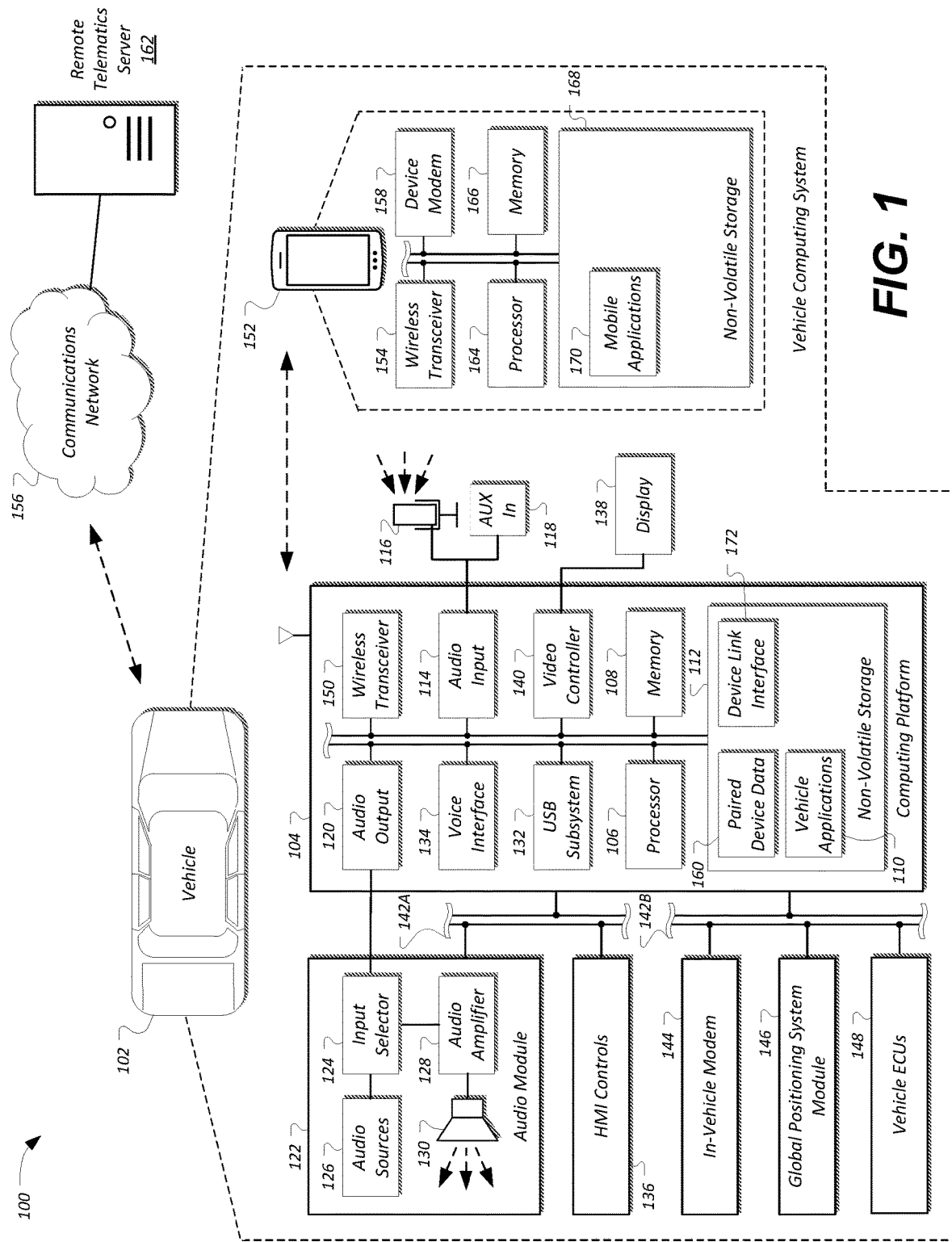
FIG. 1 illustrates an example diagram of a system configured to provide telematics services to a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A mobile application executed by a mobile device connected to a vehicle may utilize features of the vehicle. In an example, the user may execute a navigation application on the mobile phone, where the application is displayed to the user in the vehicle HMI. As the mobile application has access to vehicle features, the vehicle may authenticate the application using one or more security mechanisms. For instance, each application may be associated with an application identifier, and the vehicle may validate that the application identifier is included on a list of identifiers of applications that are allowed to communicate with the vehicle. As another possibility, each application may be associated with particular application programming interface (API) calls to which the application is authorized, and the vehicle may validate the commands the application sends to the vehicle to ensure that the application is making API calls that are indicated as being allowable.

When the application registers in-vehicle with the vehicle computing system, the application provides the application identifier to the vehicle. The vehicle computing system may then check a policy table downloaded to the vehicle computing platform from a server to identify an application policy associated with the provided application identifier. The application policy may dictate whether the application is allowed to run using the vehicle HMI, and if so, which the API permissions the application is granted with the vehicle computing system. If the policy table file does not contain policy permissions for the application identifier, the vehicle computing system may request a policy table file update from the server. The updated policy table file provided by the server may include updated policy permissions and other application information.

In some cases, the mobile application may request access to one or more secure vehicle functions. Examples of secure vehicle functions may include functions that access audio or video features of the vehicle, such as display of information to a vehicle screen, providing of audio through a vehicle audio system, use of data from an in-vehicle microphone, or other media features of the computing platform. As some other examples, secure vehicle functions may include access to vehicle diagnostics such as engine data, writing of information to the vehicle, or access to data including personally-identifiable information such as vehicle location. As even further examples, the secure vehicle functions may include authentication for one or more of mobile payment, autonomous driving, unlocking the vehicle, starting the vehicle, ride sharing, micro-rental, and access to personalization settings for a user of the mobile device.

The vehicle computing platform may further protect use of the secure vehicle functions by providing for bi-directional transport layer security to authenticate the vehicle computing platform with the mobile application. The transport layer security may include an application certificate keyed to the application executed by the mobile device, and a module certificate keyed to a computing module of the vehicle computing platform.

The application may request the application certificate from a remote server. In an example, the application may send its application identifier and name to the server in a request for a certificate or token. The server may send and the application may receive the application certificate in response to the request. To preserve security of the application certificate, the server may encode the application certificate using a symmetric secret key stored to the mobile application and the server, and the application may decrypt the application certificate using the secret key. The application certificate may be generated with a predefined timeout period (e.g., daily, monthly, weekly, etc.), after which the certificate is expired and the application may be required to request a new certificate from the server. In some cases, the server may pre-generate updated certificates, to allow for updated certificates to be available for download before the current application certificate has expired.

In the policy table, the policy server may further include the module certificate associated with the identifier of the vehicle computing system. In an example, the policy table may include module certificates keyed to a module serial number of the computing module or with the telematics control unit. The module certification may also be generated with a predefined timeout period (e.g., monthly, weekly, etc.), after which the vehicle may be required to request a new module certificate from the server.

When executed, the application may request use of a secure vehicle function. For example, the application may request use of audio or video services of the vehicle. If so, the application requests the creation of a secure tunnel between the vehicle and the mobile device. When the application certificate and the module certificate are both valid and unexpired, the secure tunnel may be validated by the computing platform. Once validated, the secure tunnel may be used to transfer data between the mobile device and the vehicle in a safe, encrypted manner. The secure tunnel may accordingly provide for additional mobile application authentication and security to communications between the application and the vehicle. Further aspects of the disclosure are discussed in detail below.

FIG. 1 illustrates an example diagram of a system 100 configured to provide telematics services to a vehicle 102. The vehicle 102 may include various types of passenger vehicle, such as crossover utility vehicle (CUV), sport utility vehicle (SUV), truck, recreational vehicle (RV), boat, plane or other mobile machine for transporting people or goods. Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used.

The computing platform 104 may include a memory 108 and one or more processors 106 configured to perform instructions, commands and other routines in support of the processes described herein. For instance, the computing platform 104 may be configured to execute instructions of vehicle applications 110 to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, Java, C, C++, C #, Objective C, Fortran, Pascal, Java Script, Python, Perl, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and auxiliary audio input 118 configured to receive audio signals from connected devices. The auxiliary audio input 118 may be a physical connection, such as an electrical wire or a fiber optic cable, or a wireless input, such as a BLUETOOTH audio connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio module 122 having audio playback functionality. In other examples, the computing platform 104 may provide the audio output to an occupant through use of one or more dedicated speakers (not illustrated). The audio module 122 may include an input selector 124 configured to provide audio content from a selected audio source 126 to an audio amplifier 128 for playback through vehicle speakers 130 or headphones (not illustrated). The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118.

The computing platform 104 may utilize a voice interface 134 to provide a hands-free interface to the computing platform 104. The voice interface 134 may support speech recognition from audio received via the microphone 116 according to grammar associated with available commands, and voice prompt generation for output via the audio module 122. The voice interface 134 may utilize probabilistic voice recognition techniques using the grammar in comparison to the input speech. In many cases, the voice interface 134 may include a standard user profile tuning for use by the voice recognition functions to allow the voice recognition to be tuned to provide good results on average, resulting in positive experiences for the maximum number of initial users. In some cases, the system may be configured to temporarily mute or otherwise override the audio source specified by the input selector 124 when an audio prompt is ready for presentation by the computing platform 104 and another audio source 126 is selected for playback.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, and a media oriented system transfer (MOST), as some examples. The in-vehicle networks 142 may allow the computing platform 104 to communicate with other vehicle 102 systems, such as a vehicle modem 144 (which may not be present in some configurations), a global positioning system (GPS) module 146 configured to provide current vehicle 102 location and heading information, and various vehicle ECUs 148 configured to corporate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio module 122 and the HMI controls 136 may communicate with the computing platform 104 over a first in-vehicle network 142A, and the vehicle modem 144, GPS module 146, and vehicle ECUs 148 may communicate with the computing platform 104 over a second in-vehicle network 142B. In other examples, the computing platform 104 may be connected to more or fewer in-vehicle networks 142. Additionally or alternatively, one or more HMI controls 136 or other components may be connected to the computing platform 104 via different in-vehicle networks 142 than shown, or directly without connection to an in-vehicle network 142.

The computing platform 104 may also be configured to communicate with mobile devices 152 of the vehicle occupants. The mobile devices 152 may be any of various types of portable computing device, such as cellular phones, tablet computers, smart watches, laptop computers, portable music players, or other devices capable of communication with the computing platform 104. In many examples, the computing platform 104 may include a wireless transceiver 150 (e.g., a BLUETOOTH module, a ZIGBEE transceiver, a Wi-Fi transceiver, an IrDA transceiver, an RFID transceiver, etc.) configured to communicate with a compatible wireless transceiver 154 of the mobile device 152. Additionally or alternately, the computing platform 104 may communicate with the mobile device 152 over a wired connection, such as via a USB connection between the mobile device 152 and the USB subsystem 132. In some examples the mobile device 152 may be battery powered, while in other cases the mobile device 152 may receive at least a portion of its power from the vehicle 102 via the wired connection.

The communications network 156 may provide communications services, such as packet-switched network services (e.g., Internet access, VoIP communication services), to devices connected to the communications network 156. An example of a communications network 156 may include a cellular telephone network. Mobile devices 152 may provide network connectivity to the communications network 156 via a device modem 158 of the mobile device 152. To facilitate the communications over the communications network 156, mobile devices 152 may be associated with unique device identifiers (e.g., mobile device numbers (MDNs), Internet protocol (IP) addresses, etc.) to identify the communications of the mobile devices 152 over the communications network 156. In some cases, occupants of the vehicle 102 or devices having permission to connect to the computing platform 104 may be identified by the computing platform 104 according to paired device data 160 maintained in the storage medium 112. The paired device data 160 may indicate, for example, the unique device identifiers of mobile devices 152 previously paired with the computing platform 104 of the vehicle 102, secret information shared between the paired device and the computing platform 104 such as link keys, and/or personal identification numbers (PINs), and most recently used or device priority information, such that the computing platform 104 may automatically reconnect to the mobile devices 152 matching data in the paired device data 160 without user intervention.

When a mobile device 152 that supports network connectivity is paired with the computing platform 104, the mobile device 152 may allow the computing platform 104 to use the network connectivity of the device modem 158 to communicate over the communications network 156 with the remote telematics server 162 or other remote computing device. In one example, the computing platform 104 may utilize a data-over-voice plan or data plan of the mobile device 152 to communicate information between the computing platform 104 and the communications network 156. Additionally or alternatively, the computing platform 104 may utilize the vehicle modem 144 to communicate information between the computing platform 104 and the communications network 156, without use of the communications facilities of the mobile device 152.

Similar to the computing platform 104, the mobile device 152 may include one or more processors 164 configured to execute instructions of mobile applications 170 loaded to a memory 166 of the mobile device 152 from storage medium 168 of the mobile device 152. In some examples, the mobile applications 170 may be configured to communicate with the computing platform 104 via the wireless transceiver 154 and with the remote telematics server 162 or other network services via the device modem 158. The computing platform 104 may also include a device link interface 172 to facilitate the integration of functionality of the mobile applications 170 into the grammar of commands available via the voice interface 134. The device link interface 172 may also provide the mobile applications 170 with access to vehicle functions and information available to the computing platform 104 via the in-vehicle networks 142. An example of a device link interface 172 may be the SYNC APPLINK component of the SYNC system provided by The Ford Motor Company of Dearborn, MI.

Figure 2:
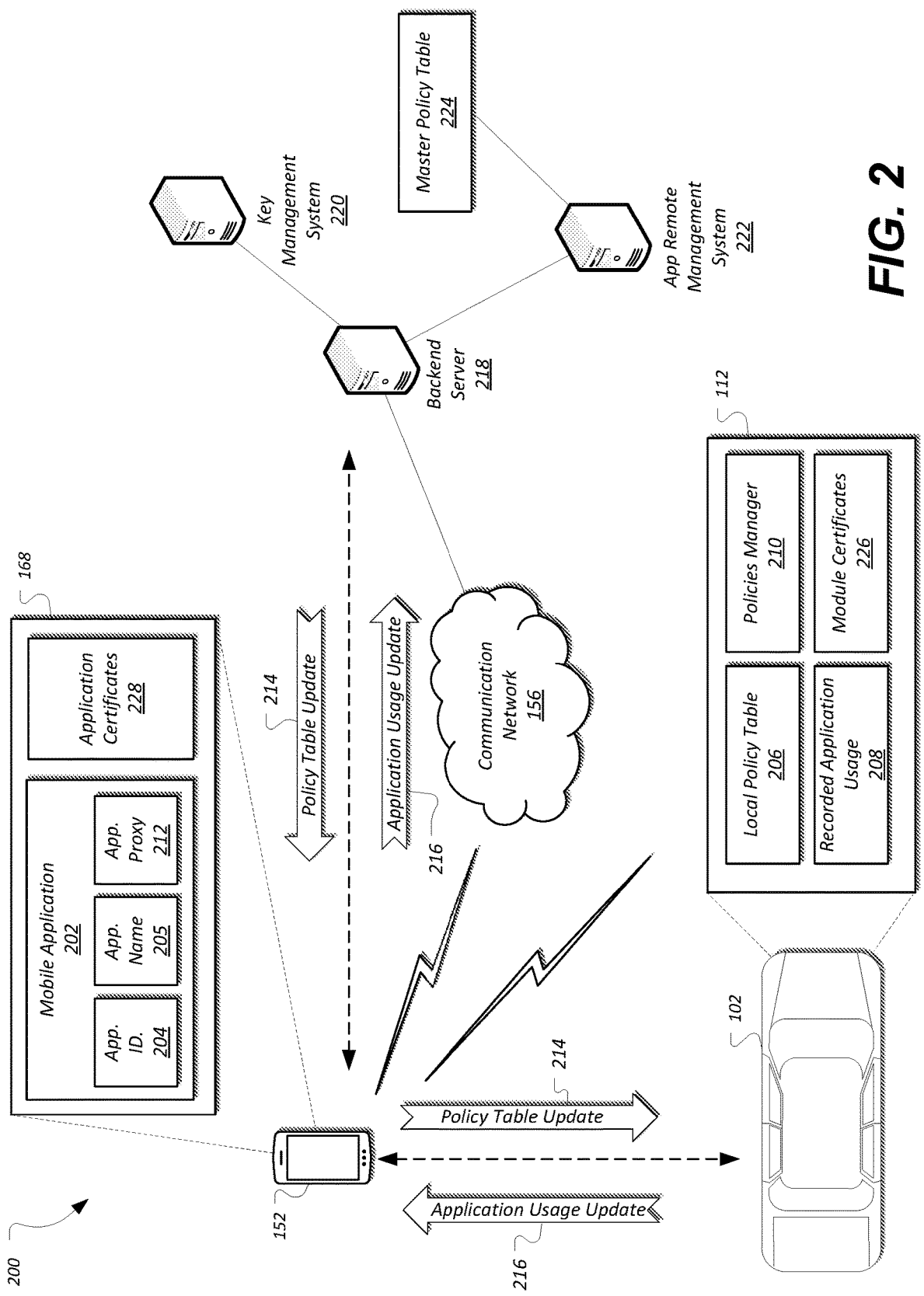
FIG. 2 illustrates an example diagram of an application policies architecture.

FIG. 2 illustrates an example diagram of an application policies architecture 200. As illustrated, the architecture 200 includes a vehicle 102 having a policies manager 210 in communication with a backend server 218 via the communications network 156. The policies manager 210 may be configured to maintain a local policy table 206 and recorded application usage 208. The mobile device 152 may execute a mobile application 202 associated with an application identifier 204 and including an application proxy 212 facilitating communication with the backend server 218 by way of the communications network 156. The backend server 218 may be configured to provide access to a key management system 220 and an application remote management system 222 maintaining a master policy table 224. As explained in detail below, the remote management system 222 may be configured to provide policy table updates 214 to the vehicle 102 via the application proxy 212 of the mobile device 152.

The mobile application 202 may be an application installed to the mobile device 152 for use with the computing platform 104 of the vehicle 102. In an example, the mobile application 202 may add functionality to the computing platform 104 by integrating voice commands controlling the functionality of the mobile application 202 with the voice interface 134 of the computing platform 104. The mobile application 202 may be further configured to utilize user interface features of the computing platform 104, such as the display 138 or the vehicle speakers 130, to provide information to vehicle occupants. In an example, the mobile application 202 may be a navigation application or a streaming media player application. As some other possibilities, the mobile application 202 may further provide for diagnostics or vehicle reporting functionality by transferring information retrieved from the vehicle 102 to a remote server for analysis.

The application identifier 204 may be a unique number or alphanumeric string assigned to a mobile application 202. In some cases, the application identifier 204 may be randomly-generated value. In other cases, the application identifier 204 may be assigned to the mobile application 202 by an authority configured to manage the application identifiers 204. The application name 205 may be a friendly user-readable name of the application 202 that may be used by the application 202 for identification in the user interface or within other contexts where identification of the application by the application identifier 204 may be undesirable.

The local policy table 206 may be configured to store key information detailing application permissions in the vehicle 102. Thus, the local policy table 206 may define the type of interaction that is allowed between the computing platform 104 and a given mobile application 202. In an example, the local policy table 206 may include permission information for the mobile applications 202 keyed according to the application identifiers 204 assigned to the mobile applications 202.

The permission information may include, for example, a listing of APIs and vehicle 102 systems that are deemed allowable for use by the mobile applications 202. As some specific examples, the local policy table 206 may include permission information with respect to remote procedure calls of the computing platform 104 that are allowable for access by the mobile application 202, such as to stream audio using the audio module 122, use the display 138, receive input from the HMI controls 136, or to retrieve a current GPS location of the vehicle 102. As some other examples, the local policy table 206 may include permission information with respect whether the mobile application 202 has permission to perform a context switch and take focus from another application, e.g., to interrupt the radio to provide a message. As yet a further example, the local policy table 206 may include permission information with respect whether the mobile application 202 may execute scripts on the computing platform 104. As an even a further example, the local policy table 206 may include permission information with respect to which vehicle 102 functions may be utilized when the vehicle 102 is parked or stationary, and which may be used when the vehicle 102 is in motion. The local policy table 206 may also include information to configure how and when the vehicle 102 requests updates to the local policy table 206, as well as information regarding how to contact a source of updated local policy tables 206 (e.g., a URL or other address of the backend server 218).

The recorded application usage 208 may include logged usage of the API and vehicle 102 system usage, or other vehicle 102 functions whose permission is controlled for the mobile applications 202. Thus, the recorded application usage 208 may include collected usage data regarding how users are using the mobile applications 202 in the vehicle 102. As with the local policy table 206, the recorded application usage 208 may be keyed according to the application identifiers 204 assigned to the mobile applications 202. In some examples, the recorded application usage 208 may be included within the local policy table 206, while in other examples the recorded application usage 208 may be maintained separate from the local policy table 206. As some specific examples of logged information, the recorded application usage 208 may include run attempts of the mobile application 202, errors experienced by the mobile application 202 (e.g., permission denied errors, unexpected errors such as those due to programming errors, etc.), logged HMI usage information (e.g., steering wheel control usage, voice command usage, etc.), and audible time during which the mobile application 202 provided audio through the vehicle 102 HMI.

The policies manager 210 may be configured to manage mobile application 202 permissions for the computing platform 104 of the vehicle 102. In an example, the policies manager 210 may maintain the local policy table 206. When a mobile application 202 is initiated or activated, the policies manager 210 may identify the permissions associated with a mobile application 202 based on the local policy table 206. Moreover, when the mobile application 202 interacts with the computing platform 104, the policies manager 210 may record the mobile application 202 usage of vehicle APIs and vehicle 102 systems in the recorded application usage 208.

The policies manager 210 of the computing platform 104 may be further configured to manage communication to the backend server 218. In terms of requests or responses between the policies manager 210 and the backed server 218, the policies manager 210 may be configured to initiate communications to the backend server 218. In an example, the policies manager 210 may provide a message to the backend server 218 to inform the backend server 218 that the vehicle 102 is on and listening for information. In some cases, the backend server 218 may address an unsolicited message to a specific vehicle 102 and push it to the cloud. However, the message may not be delivered to the vehicle 102 until the computing platform 104 connects and requests it from the backend server 218.

The policies manager 210 may be configured to request the backend server 218 to provide the vehicle 102 with updates to the local policy table 206. For instance, the policies manager 210 may request an update to the local policy table 206 if a mobile application 202 having an application identifier 204 not in the local policy table 206 attempts to integrate with the computing platform 104 of the vehicle 102.

The policies manager 210 may be further configured to provide the recorded application usage 208 to the backend server 218 for remote review and processing. To do so, the policies manager 210 may provide an application usage update 216 message including the recorded application usage 208 information stored by the vehicle 102. This may allow the system to verify that the mobile application 202 is utilizing the APIs and vehicle 102 systems appropriately, given the apparent purpose of the mobile application 202. For instance, it may be reasonable for a navigation mobile application 202 to periodically request speed information for the vehicle 102, but it may be unreasonable for an internet radio mobile application 202 to do so.

The application proxy 212 may be configured to facilitate the communication of the policies manager 210 with the backend server 218. In an example, the application proxy 212 may include a library or other code module compiled or linked into the mobile applications 202 and providing functionality to allow the policies manager 210 to communicate through the mobile applications 202 to the backend server 218. The policies manager 210 may accordingly utilize the application proxy 212 to request policy table updates 214 via the backend server 218, provide application usage updates 216 to the backend server 218, receive policy table updates 214 from the backend server 218, and negotiate the creation of secure tunnels between the mobile device 152 and the computing platform 104. The policy table updates 214 may include, for example, a new local policy table 206 to replace the local policy table 206 currently stored by the policies manager 210, or updates to an existing local policy table 206 to augment the current entries of the local policy table 206. The application proxy 212 may further include other functionality that may be useful for communication with the backend server 218, such as the ability to pass encrypted messages between the computing platform 104 and the backend server 218. Thus, in some cases operations discussed herein related to the functioning of the mobile application 202 with respect to application polices generally, may be implemented by the application proxy 212 code of the mobile application 202.

The wireless transceiver 115 of the vehicle 102 may be connected to a paired mobile device 152 (e.g. via a BLUETOOTH connection, via a USB connection, etc.), such that the communications features of the mobile device 152 may be used to allow the computing platform 104 to communicate via the communications network 156 with the backend server 218. The communications network 156 may accordingly be utilized by the mobile device 152 via a cellular data plan of the mobile device 152 (e.g., to provide TCP/IP-based communications functionality to the computing platform 104. Additionally or alternatively, the computing platform 104 may utilize the vehicle modem 144 to communicate data between the processor 106 and the communications network 156. Messages directed to the vehicle 102 via the communications network 156 may be queued in the cloud until a connection to the vehicle 102 can be established or until the message expires. In an example, the queuing and message expiration functionality may be implemented via the backend server 218. The communications network 156 message queuing functionality may also act as a first line of defense against server denial-of-service attacks.

The backend server 218 may be configured to operate as a gateway between the communications network 156 and the internal application management infrastructure. In an example, the internal application management infrastructure may be managed by a manufacturer of the vehicles 102, while in another example the internal application management infrastructure may be managed by another party, such as an application certification entity. The backend server 218 may be configured to perform as a firewall to validate, transform, and route messages between systems behind the backend server 218 (such as the key management system 220 and application remote management system 222) and vehicles 102 outside the internal application management infrastructure.

The key management system 220 may include one or more servers or other computing devices configured to provide secure messaging services for messages to and from the backend server 218. For example, the key management system 220 may authenticate, decrypt and validate incoming messages, forward the decrypted and validated message to the proper internal destination, and provide outbound message security to encrypt and sign outgoing data and ensure that the outgoing messages pass security checks when they are received by the computing platform 104 of the intended vehicle 102. In an example, the key management system 220 may validate messages against replay attacks by assigning message identifiers to outgoing messages, and verifying that appropriate message identifiers are included in incoming messages.

When a message or request is received by the backend server 218, the backend server 218 forwards the message to the key management system 220, where it is authenticated, decrypted, and validated. If these operations are successful, the backend server 218 may retrieve the message payload from the message and route the message to an appropriate application according to a service type identified by the message. In an example, policy table messages (e.g., requests for policy table updates 214, or for certificates as discussed below) may be associated with a service type indicating that the messages are to be routed to the application remote management system 222.

The application remote management system 222 may include one or more servers or other computing devices that are configured to receive application usage updates 216 from the vehicle 102, as well as to provide policy table updates 214 to the vehicle 102. In an example, the application remote management system 222 may receive a snapshot of a local policy table 206 of the vehicle 102 in an application usage update 216 message. The local policy table 206 may include recorded application usage 208 for mobile applications 202 having interacted with the vehicle 102. The application remote management system 222 may archive the recorded application usage 208 from the received local policy table 206 and may update the application permissions stored by the vehicle 102 by providing the vehicle 102 with a policy table update 214. The policy table update 214 may be based on latest information maintained by the application remote management system 222 in a master policy table 224 of the latest mobile application 202 permissions. In an example, each version of a mobile application 202 (e.g. version 2 vs. version 2.1) may be associated with its own permission information in the master policy table 224. Notably, the master policy table 224 information provided in the policy table update 214 to the vehicle 102 may lack any recorded application usage 208 data, but may include up-to-date permissions for any mobile applications 202 that were identified as being used by the vehicle 102 according to the received local policy table 206 of the application usage update 216.

In a transport layer security (TLS) system, a server may send a public key to a client, and the client may respond by sending its public key to the server. Public keys may be stored in data elements referred to as certificates, while private keys may be referred to as keys. TLS uses certificates to describe the public and private key pairs to use. In a non-limiting example, TLS may uses certificate defined by the X.509 standard. The public and private keys may be generated in pairs. If the public key is used to encrypt data, only the private key of the pair can decrypt it; likewise, if the private key is used to encrypt, the public key must be used to decrypt.

TLS may be used to provide access control and cryptographic security to communications between the mobile application 202 executed by the mobile device 152 and the computing platform 104 of the vehicle 102. The local policy table 206 may include a module certificate 226 keyed to the vehicle computing platform 104. The module certificate 226 may contain the public keys used for the computing platform 104 side of the TLS communications between the mobile application 202 and the computing platform 104. Similarly, the mobile applications 202 installed to the mobile devices 152 may utilize application certificates 228 keyed to the mobile applications 202 and containing the public keys used for the mobile device 152 side of TLS communications.

FIG. 3 illustrates an example diagram of a mobile application 202 executed by the mobile device 152 utilizing a secure tunnel 302 with the computing platform 104 of the vehicle 102. The secure tunnel 302 may be a secure connection between the mobile application 202 and the computing platform 104 created using the application certificate 228 of the mobile application 202 and the module certificate 226 of the computing platform 104.

In an example, the mobile device 152 may operate as the TLS server, and the computing platform 104 may operate as the TLS client device. In such an example, the computing platform 104 may connect to the mobile device 152 to request a secure connection. For instance, the computing platform 104 may request the creation of a secure tunnel 302 for a mobile application 202 indicated in the local policy table 206 as requiring the use of audio/video or other media features of the computing platform 104.

In response to the request the creation of a secure tunnel 302, the mobile device 152 may send the application certificate 228 of the mobile application 202 to the computing platform 104. The computing platform 104 may, in an example, contact the application remote management system 222 to confirm the validity of the application certificate 228 before proceeding. In other examples, the computing platform 104 may validate expiration date or other aspects of the application certificate 228 without querying the authority providing the application certificate 228 for confirmation.

To create the secure tunnel 302, the mobile device 152 and computing platform 104 may perform a handshake procedure to generate a session key for subsequent encryption and decryption of data during the session. In an example the session key may be generated using a Diffie-Hellman key exchange. In another example, the session key may be generated by encryption of a random number with the public key of the application certificate 228, for decryption by the mobile device 152 using the private key associated with the application certificate 228. Once the session key is generated, the secure tunnel 302 may be established. The secure key may accordingly be used for symmetric encryption and decryption of data until the secure tunnel 302 is closed.

FIG. 4 illustrates an example diagram of a mobile application 202 requesting an application certificate 228. The application certificate 228 may be generated with a predefined timeout period (e.g., monthly, weekly, etc.), after which the mobile application 202 may be required to request a new certificate. For example, the application certificate 228 may indicate an expiration timeout after which the application certificate 228 may no longer be used for TLS communications between the mobile device 152 and the vehicle 102.

The mobile application 202 may request the application certificate 228 from a remote server. For example, the mobile application 202 may request a new application certificate 228 if the currently stored application certificate 228 for the mobile application 202 is expired, or if no application certificate 228 is currently stored by the mobile device 152 for the mobile application 202. In the illustrated example, the remote server may be the application remote management system 222, although other examples are possible.

The mobile application 202 may encode its application name 205 and the application identifier 204 into a certificate request 404 (e.g., via the application proxy 212), and may send the certificate request 404 to the application remote management system 222 in a request for a new application certificate 228. In some cases, the certificate request 404 may be encrypted by the mobile device 152 for transport, and may be sent by the mobile application 202 from the mobile device 152 to the application remote management system 222 over the communications network 156.

The application remote management system 222 may receive the certificate request 404, and may decrypt the certificate request 404. In an example, the application remote management system 222 may utilize services of the key management system 220 to decrypt the certificate request 404. The application remote management system 222 may verify that the application name 205 is the correct application name 205 for the application identifier 204, and if so, may generate the new application certificate 228. The new application certificate 228 may be generated to include keys that are paired to the current module certificate 226 included in the master policy table 224 corresponding to the application identifier 204.

To ensure security of the application certificate 228 during transit from the application remote management system 222 to the mobile device 152, the application remote management system 222 may encrypt the application certificate 228. In an example the application remote management system 222 may implement a blob encryptor 406 configured to encrypt the contents of the application certificate 228 into an encrypted blob 410 to prevent the application certificate 228 from being captured in transit. The encryption may be performed, in an example, using a symmetric secret key 402 known by application remote management system 222 to be associated with the mobile application 202 (e.g., indexed according to application identifier 204, etc.). The secret key 402 may be encoded within the application proxy 212 of the application 202 and may be used for the decryption. For example, each different mobile application identifier 204 may be provided with its own specific application proxy 212 object file including a symmetric key 402 specific to the mobile application identifier 204. The object file may then be compiled into the mobile application 202. The application remote management system 222 may send the encrypted blob 410 to the mobile device 152 in a certificate response 408, responsive to the certificate request 404.

The mobile application 202 may receive the certificate response 308, and may decrypt the encrypted blob 410 using a decryption library of the application proxy 212 to retrieve the new application certificate 228. In an example, the decryption library may use the secret key 402 hardcoded to the mobile application 202 and used by the blob encryptor 406 to create the encrypted blob 410. Once received and decrypted, the new application certificate 228 may be installed to storage 168 of the mobile device 152 and be made available for use by the mobile application 202 for use in creating secure tunnels 302 with the computing platform 104. In many examples, the application certificate 228 may be maintained in the storage 168 in an encrypted form to ensure security of the application certificate 228 when at rest.

Figure 5:
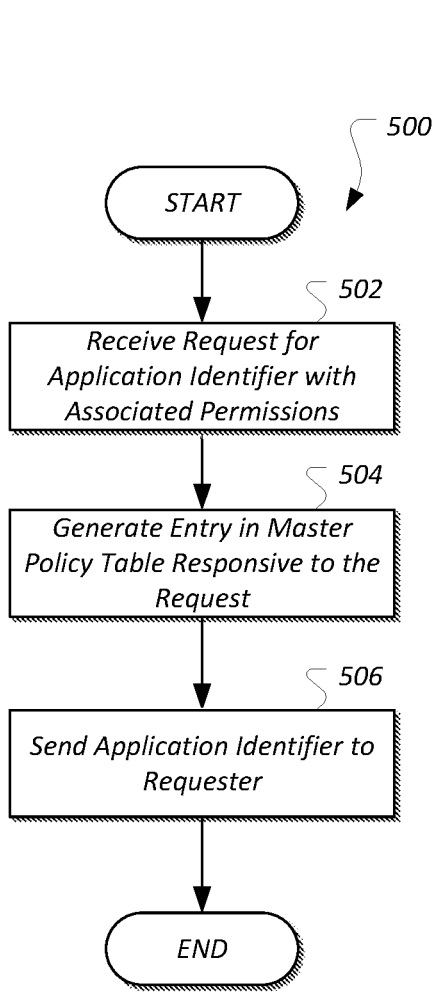
FIG. 5 illustrates an example process for updating a master policy table.

FIG. 5 illustrates an example process 500 for updating a master policy table 224. The process 500 may be performed, for example, by the application remote management system 222.

At operation 502, the application remote management system 222 receives a request for an application identifier 204 for a mobile application 202. The request may further include additional information, such as permissions being requested for use by the mobile application 202, a category in which the mobile application 202 should be placed, and a vendor of the mobile application 202.

At operation 504, the application remote management system 222 generates an entry in the master policy table 224 responsive to the request. The generated entry may indicate the requested permissions and other information, and may further specify an application identifier 204 to be associated with the mobile application 202. In some examples, the application identifier 204 may be a randomly or incrementally generated value (e.g., next available number or sequence identifier).

At operation 506, the application remote management system 222 sends the application identifier 204 to the requester. For example, the application remote management system 222 may generate an application identifier 204 associated with the information received at operation 502, and may provide the generated application identifier 204 to the application developer for association with the mobile application 202. After operation 506, the process 500 ends.

Figure 6:
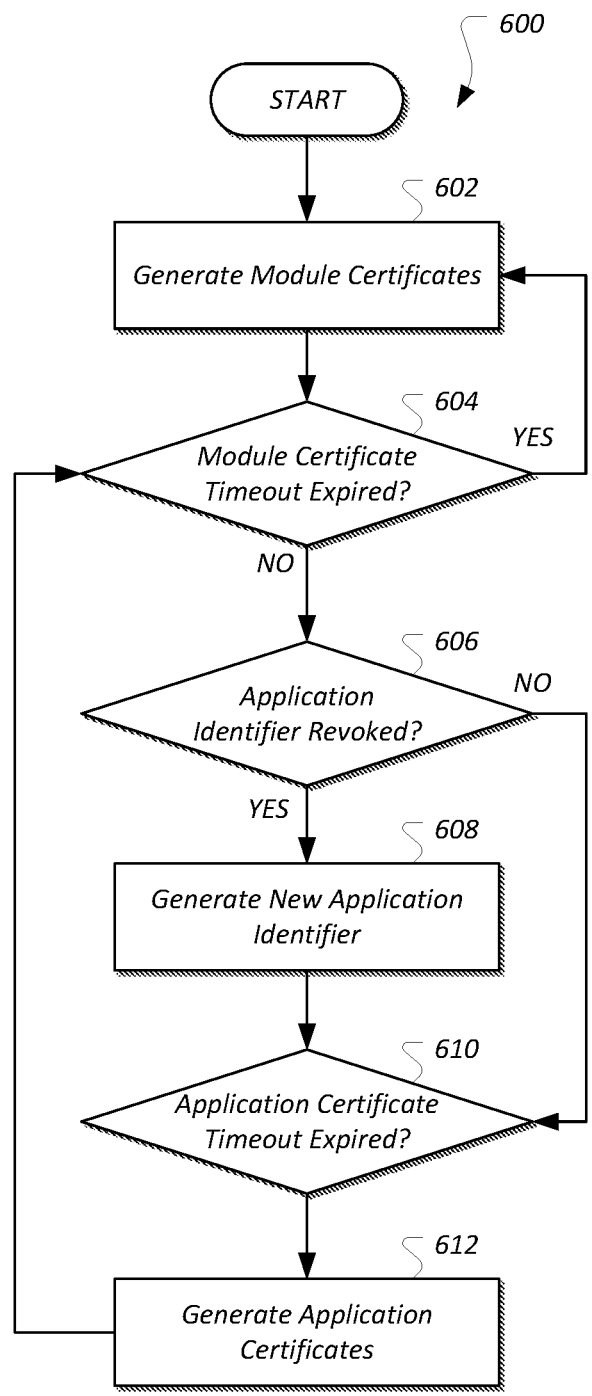
FIG. 6 illustrates an example process for generating certificates by the application remote management system.

FIG. 6 illustrates an example process 600 for generating certificates by the application remote management system 222. At operation 602, the application remote management system 222 generates module certificates 226 for the computing platforms 104 of the vehicles 102. In an example, the module certificates 226 may be individually keyed per-vehicle 102 to a unique identifier of the vehicle 102, such as a VIN of the vehicle 102 and/or a unique identifier of the computing platform 104 of the vehicle 102 (e.g., to a serial number of the SYNC module). In an example, the module certificate 226 contains keys used for the computing platform 104 side of the TLS communications between the mobile application 202 and the computing platform 104.

At operation 604, the application remote management system 222 determines whether a module key generation timeout has expired. In an example, the application remote management system 222 may be configured to periodically regenerate the module certificates 226 keyed to the vehicle computing platforms 104. For instance, the module certificates 226 may be issued with a predefined timeout period (e.g., monthly, weekly, etc.), after which the vehicle 102 may be required to request a new certificate from the application remote management system 222. Accordingly, new module certificates 226 may be pre-generated by the application remote management system 222 to be available when requested by vehicles 102. (In other examples, the module certificates 226 may be generated on-demand responsive to vehicle 102 requests.) If the module key generation timeout has expired, control passes to operation 602. Otherwise, control passes to operation 606.

At operation 606, the application remote management system 222 determines whether any application identifiers 204 for mobile applications 202 have been revoked. For instance, if an application 202 is identified as having undesirable characteristics, or if there is a possibility that an application 202 has been compromised, the application remote management system 222 may revoke the application identifier 204 of the application 202. In such a case, a new application identifier 204 may be assigned to the application 202, to allow for a new version of the application 202 to be required. In doing so, no additional the application certificates 228 will be generated for the revoked application identifier 204, and so the mobile application 202 having the application identifier 204 will be unable to continue to utilize the computing platform 104 once its current application certificate 228 is expired. If application identifiers 204 have been revoked, control passes to operation 608. Otherwise, control passes to operation 610.

At operation 608, the application remote management system 222 generates a new application identifier 204. In an example, the application remote management system 222 may update the entry in the master policy table 224 indicating the application identifier 204 of the application 202. Thus, for users to continue using the application 202 with the vehicle 102, the users would download a new version of the application 202 having the new application identifier 204.

At operation 610, the application remote management system 222 determines whether an application key generation timeout has expired. In an example, the application remote management system 222 may be configured to periodically regenerate the application certificates 228 keyed to the applications 202. This may be done, for example, for new applications 202 added to the master policy table 224, for applications 202 with new application identifiers 204 in the master policy table 224, and/or for existing application 202 entries in the master policy table 224. It should be noted that the updating of the application certificates 228 may be done more often than the expiration period of the application certificates 228. For instance, the application certificates 228 may be set to have an expiration of five days or seven days, but the application certificates 228 may be regenerated nightly. Thus, the mobile device 152 may be able to request updated application certificates 228 before the expiration of the application certificates 228 (e.g., attempt daily for a certificate expiring after multiple days), but may also be able to have additional time on the application certificates 228 to continue to use the application 202 as authorized for beyond the polling and regeneration frequency of the application certificates 228. If the application key generation timeout has expired, control passes to operation 612. Otherwise, control passes to operation 604.

Figures 7, 8:
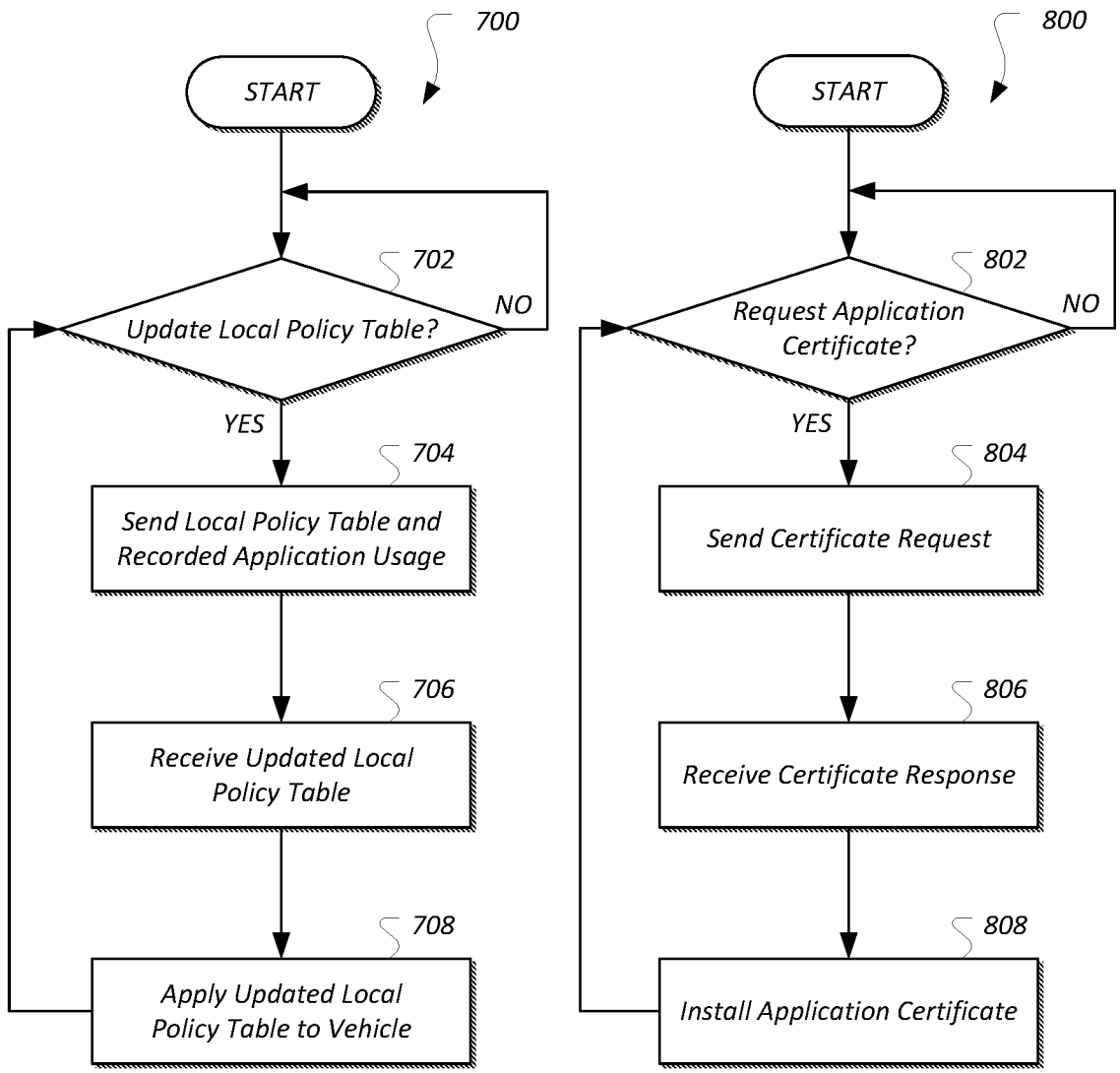
FIG. 7 illustrates an example process for updating a local policy table of the vehicle.
FIG. 8 illustrates an example process for a mobile device requesting an application certificate for a mobile application.

FIG. 7 illustrates an example process 700 for updating a local policy table 206 of the vehicle 102. The process 700 may be performed, for example, by the policies manager 210 of the computing platform 104.

At operation 702, the computing platform 104 determines whether an update to the local policy table 206 is indicated.

In an example, the computing platform 104 may determine that the local policy table 206 should be updated due to the computing platform 104 identifying that an application identifier 204 of a mobile application 202 app is not listed on the local policy table 206. In another example, the computing platform 104 may determine that the local policy table 206 should be updated when the user starts a mobile application 202 that requires a local policy table 206 update and the policies manager 210 has not received an updated local policy table 206 over the initial request sequence. In yet further examples, the computing platform 104 may determine that the local policy table 206 should be updated after one or more of: 'N' ignition cycles (e.g., where 'N' is defined within the local policy table 206), after 'M' kilometers have been recorded on the vehicle 102 odometer (e.g., where 'M' is defined within the local policy table 206), after 'O' elapsed time e.g., where 'O' is defined within the local policy table 206).

Moreover, an update to the local policy table 206 may be indicated based on expiration of a module certificate 226 included in the local policy table 206. In an example, when creation of a secure tunnel 302 is attempted with a module certificate 226 that is expired, the expiration of the module certificate 226 may trigger an update of the local policy table 206.

If the computing platform 104 determines to update the local policy table 206, control passes to operation 704. Otherwise, control remains at operation 702.

At operation 704, the computing platform 104 sends an application usage update 216 message to the application remote management system 222. The application usage update 216 may include the current local policy table 206, and may be sent to an address according to address information included in the local policy table 206 (e.g., an update server URL). The application usage update 216 or the current local policy table 206 may further include the recorded application usage 208. The application usage update 216 may be sent to the application remote management system 222 via the backend server 218, and may be associated with a service type indicating that the message is to be routed to the application remote management system 222.

At operation 706, the computing platform 104 receives a policy table update 214 message from the backend server 218. The policy table update 214 may include a new local policy table 206 to augment or replace the current local policy table 206 of the vehicle 102. The updated local policy table 206 may include the latest application permissions for the mobile applications 202 included in the local policy table 206 sent to the backend server, as well as the latest module certificate 226 for the computing platform 104. The new local policy table 206 may however, not include any recorded application usage 208.

At operation 708, the computing platform 104 applies the updated local policy table 206. Accordingly, the updated application permission may be made available for use. After operation 708, the process 700 returns to operation 702.

FIG. 8 illustrates an example process 800 for a mobile device 152 requesting an application certificate 228 for a mobile application 202. In an example, the process 800 may be performed by the mobile device 152 on which the mobile application 202 is installed.

At operation 802, the mobile device 152 determines whether to request the application certificate 228 for a mobile application 202. For example, the application proxy 212 of the mobile application 202 may request a new application certificate 228 if the currently stored application certificate 228 for the mobile application 202 is expired, or if no application certificate 228 is currently stored by the mobile device 152 for the mobile application 202 keyed to the application identifier 204. In another example, the application proxy 212 of the mobile application 202 may request a new application certificate 228 periodically, e.g., daily. If the mobile device 152 determines to request the application certificate 228, control passes to operation 804. Otherwise, control remains at operation 802.

At operation 804, the mobile device 152 sends the certificate request 404. In an example, the application proxy 212 of the mobile application 202 may encode its application identifier 204 and application name 205 into the certificate request 404. The application proxy 212 may encrypt the certificate request 404 for transport over the communications network 156, and may send the certificate request 404 from the mobile device 152 to the application remote management system 222 over the communications network 156.

At operation 806, the mobile device 152 receives the certificate response 408. In an example, the mobile device 152 may receive the certificate response 408 from the application remote management system 222 responsive to the request, and may decrypt the encrypted blob 410 using the secret key 412 encoded in the application proxy 212 to retrieve the new application certificate 228. The certificate response 408 may include the new application certificate 228.

At operation 808, the mobile device 152 installs the application certificate 228. Once received, the mobile device 152 may install the application certificate 228 to storage 168 of the mobile device 152 and be made available for use by the mobile application 202 for use in creating secure tunnels 302 with the computing platform 104. In many examples, the application certificate 228 may be maintained in the storage 168 in an encrypted form to ensure security of the application certificate 228. After operation 808, the process 800 returns to operation 802.

Figure 9:
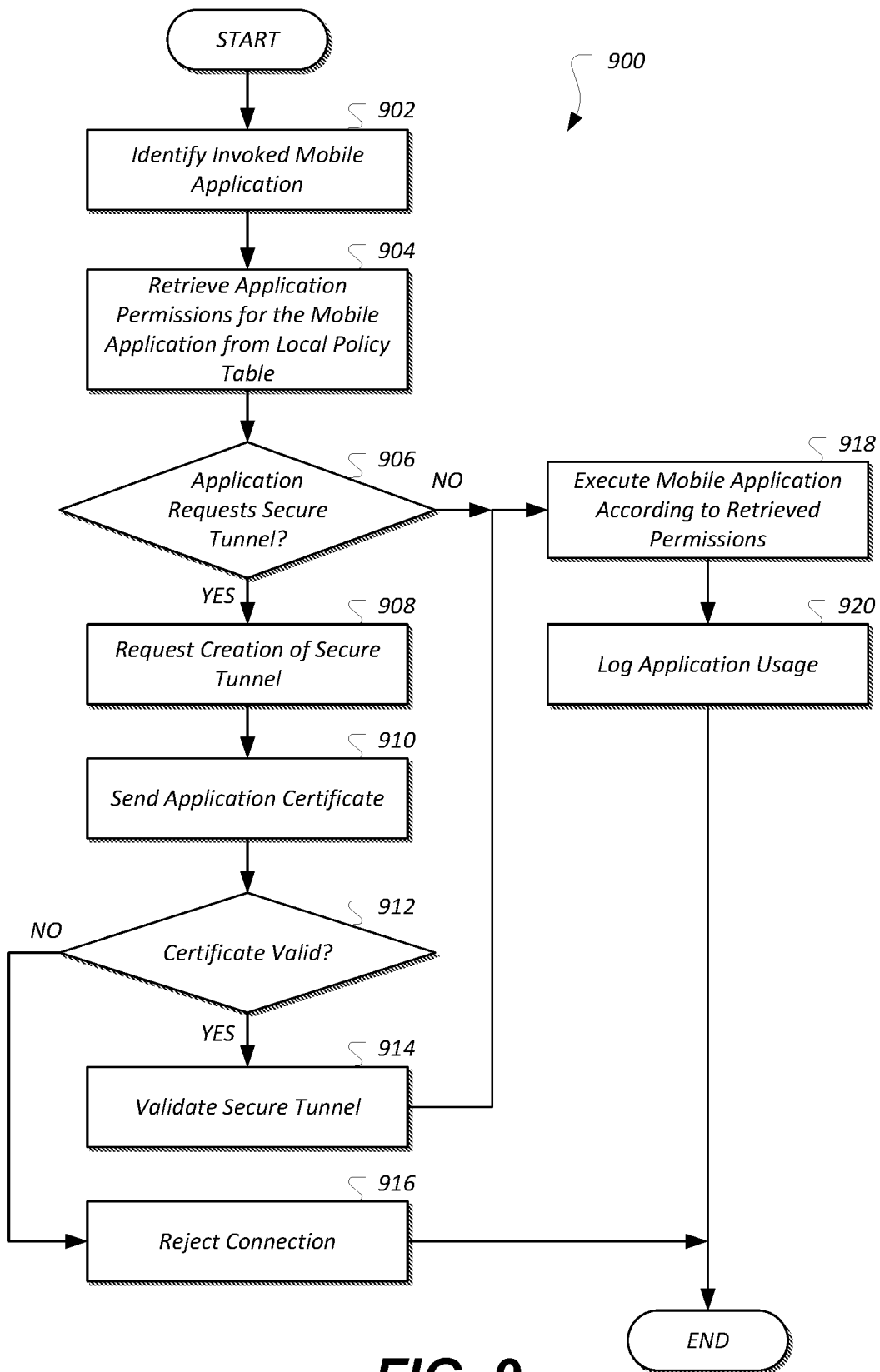
FIG. 9 illustrates an example process for using a local policy table and certificates for permission control for mobile applications.

FIG. 9 illustrates an example process 900 for using a local policy table 206 and certificates for permission control for mobile applications 202. As with the process 600, the process 900 may be performed, for example, by the policies manager 210 of the computing platform 104.

At operation 902, the computing platform 104 identifies an invoked mobile application 202. For example, the computing platform 104 may receive a listing of applications identifiers 204 of mobile applications 202 available on the mobile device 152. As another example, the computing platform 104 may receive an indication of initiation of a mobile application 202 on the mobile device 152.

At operation 904, the computing platform 104 retrieves application permissions for the mobile application 202 from the local policy table 206. In an example, the computing platform 104 may query the local policy table 206 for application permissions associated with the application identifier 204 of the mobile application 202. In another example, the computing platform 104 may query the local policy table 206 for application permissions associated with the paired mobile device 152 executing the mobile application 202 as well as the application identifier 204 of the mobile application 202. In some cases, if use of the mobile application 202 has not yet been consented to by the user, the computing platform 104 may display a user interface in the vehicle 102 HMI from which the user may grant permission to use the mobile application 202 with the computing platform 104.

At operation 906, the mobile application 202 determines whether the mobile application 202 requires a secure tunnel 302. In an example, if the mobile application 202 attempts to access a secure vehicle function services that is flagged as requiring encryption, the mobile application 202 may request the creation of a secure tunnel 302. As some examples, the mobile application 202 may attempt to access secure vehicle function services such as such as audio and/or video function or other media features of the computing platform 104, vehicle diagnostics such as engine data, writing of information to the vehicle 102, personally-identifiable information such as location, or access to audio data from the microphone 116. As even further examples, the mobile application 202 may attempt to access secure vehicle function services for authentication for one or more of mobile payment, autonomous driving, unlocking the vehicle, starting the vehicle, ride sharing, micro-rental, and access to personalization settings for a user of the mobile device. If the mobile application 202 requires the secure tunnel 302, control passes to operation 908. Otherwise control passes to operation 918 to proceed without the secure tunnel 302.

At operation 908, the mobile application 202 requests the mobile device 152 for creation of the secure tunnel 302. In an example, responsive to the mobile application 202 requesting the service flagged as requiring encryption, the computing platform 104 may connect as a TLS client to the mobile device 152 operating as a TLS server. The computing platform 104 may further request the application certificate 228 of the mobile application 202.

At operation 910, the computing platform 104 receives the application certificate 228. In response to the request the creation of a secure tunnel 302, the mobile device 152 may send the application certificate 228 of the mobile application 202 to the computing platform 104.

At operation 912, the computing platform 104 determines whether the application certificate 228 is valid. In an example, the computing platform 104 may, in an example, contact the application remote management system 222 to confirm the validity of the application certificate 228 before proceeding. In another example, the computing platform 104 may validate expiration date, application identifier 204, application name 205, or other aspects of the application certificate 228 without querying the authority providing the application certificate 228 for confirmation. If the computing platform 104 determines that the application certificate 228 is valid, control passes to operation 914. Otherwise, control passes to operation 916.

At operation 914 the computing platform 104 creates the secure tunnel 302. In an example, the mobile device 152 and computing platform 104 may perform a handshake procedure to generate a session key for subsequent encryption and decryption of data during the session. For instance, the session key may be generated using a Diffie-Hellman key exchange or by encryption of a random number with the public key of the application certificate 228, for decryption by the mobile device 152 using the private key associated with the application certificate 228. Regardless of approach, the secure key may accordingly be used for symmetric encryption and decryption of data over the secure tunnel 302 is closed. After operation 914, control passes to operation 918 to continue the connection of the mobile application 202 using the established secure tunnel 302.

At operation 916, the computing platform 104 rejects the connection of the mobile application 202 to the computing platform 104. In some cases, the computing platform 104 may display an error message in the vehicle HMI indicating that the mobile application 202 is not authorized to use the computing platform 104. In some examples, the computing platform 104 may inform the remote management system 222 or other server of the failure. After operation 916, the process 900 ends.

At operation 918, the computing platform 104 executes the mobile application 202 according to the retrieved permissions. The computing platform 104 may accordingly provide the mobile application 202 with access to vehicle 102 systems such as available features and HMI, in accordance with the application permissions associated with the mobile application 202 and, in some examples, further according to the mobile device 152.

At operation 920, the computing platform 104 logs application usage of the mobile application 202. For example, the computing platform 104 may record application usage 208 including usage of vehicle functions, APIs, RPCs and vehicle 102 systems by the mobile applications 202. After operation 920, the process 900 ends.

Computing devices described herein, such as the computing platform 104, mobile devices 152, and servers remote to the vehicle 102, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C #, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
 a computing platform of a vehicle programmed to
  request creation of a secure tunnel for a mobile application executed by a mobile device, the mobile application being indicated as requiring use of a secure function of the computing platform by a local policy table of the computing platform defining application permissions in the vehicle;

retrieve an application certificate keyed to an application identifier of the mobile application from the mobile application;

create the secure tunnel using both the application certificate and a module certificate stored to the local policy table; and execute the mobile application via the secure tunnel according to the application permissions.

2. The system of claim 1, wherein the secure function includes access to an audio feature or a video vehicle feature of the computing platform.

3. The system of claim 1, wherein the secure function includes one or more of access to vehicle diagnostics, access to writing of information to the vehicle, or access to personally-identifiable information.

4. The system of claim 1, wherein the secure function includes authentication for one or more of mobile payment, autonomous driving, unlocking the vehicle, starting the vehicle, ride sharing, micro-rental, and access to personalization settings for a user of the mobile device.

5. The system of claim 1, wherein the computing platform is further programmed to validate that the application certificate is keyed to the application identifier and is unexpired.

6. The system of claim 1, wherein the computing platform is further programmed to validate the module certificate as being keyed to the computing platform and unexpired.

7. The system of claim 1, wherein the computing platform is further programmed to, responsive to occurrence of expiration of the module certificate corresponding to the computing platform, send an application usage update message to the mobile device configured to cause the mobile device to request a policy table update from a remote server, the policy table update including a new module certificate.

8. The system of claim 1, wherein the computing platform is further programmed to provide the mobile application with access to vehicle functions for which the mobile application is authorized in accordance with application permissions in the local policy table.

9. The system of claim 1, wherein the computing platform is further programmed to terminate the mobile application responsive to failing to validate creation of the secure tunnel.

10. The system of claim 1, wherein the computing platform is further programmed to refuse the mobile application access to the secure function responsive to failing to validate creation of the secure tunnel.

11. A system comprising:
a mobile device, connected to a computing platform of a vehicle, programmed to
execute a mobile application requiring a secure function;
send a request to create a secure tunnel with the computing platform responsive to a determination by the computing platform that the mobile application requires use of a secure function of the computing platform identified via a local policy table of the computing platform;
send to the computing platform an application certificate specific to an application identifier of the mobile application to validate creation of the secure tunnel; and
execute the secure function via the secure tunnel.

12. The system of claim 11, wherein the secure function includes audio and video features of the computing platform.

13. The system of claim 11, wherein the secure function includes one or more of access to vehicle diagnostics, access to writing of information to the vehicle, or access to personally-identifiable information.

14. The system of claim 11, wherein the mobile device is further programmed to:
send a certificate request for the application certificate to a remote server, the request including an application identifier of the mobile application and a name of the mobile application;
receive a certificate response from the remote server, the certificate response including an encrypted blob containing the application certificate; and
utilize a decryption library of the mobile device to decrypt the encrypted blob containing the application certificate using a secret key.

15. The system of claim 11, wherein the mobile device is further programmed to maintain the application certificate in a storage of the mobile device in encrypted form.

16. The system of claim 11, wherein and application certificate is specified as expiring after a plurality of days, and the mobile device is further programmed to request an updated application certificate daily.

17. A method comprising:
sending, by a mobile device connected to a computing platform, a request creating a secure tunnel with the computing platform to execute a mobile application responsive to receipt of a determination by the computing platform that the mobile application requires use of a secure function of the computing platform identified via a local policy table of the computing platform;
receiving validation of the secure tunnel with the computing platform performed using an application certificate specific to the mobile application stored to the mobile device and a module certificate stored to a local policy table of the computing platform; and
executing the secure function via the secure tunnel.

18. The method of claim 17, wherein the secure function includes an audio feature or a video feature of the computing platform.

19. The method of claim 17, wherein the secure function includes one or more of access to vehicle diagnostics, access to writing of information to the computing platform, or access to personally-identifiable information.

20. The method of claim 17, wherein the secure function includes authentication for one or more of mobile payment, autonomous driving, vehicle unlocking, vehicle starting, ride sharing, micro-rental, and access to personalization settings for a user of the mobile device.

21. The method of claim 17, wherein the application certificate is keyed to an application identifier of the mobile application, and further comprising sending the application certificate to the computing platform for validation of the application identifier and that the application certificate has not expired.

22. The method of claim 17, further comprising:
sending a certificate request for the application certificate to a remote server, the request including an application identifier of the mobile application and a name of the mobile application;
receiving a certificate response from the remote server, the certificate response including an encrypted blob containing the application certificate; and
utilizing a decryption library of the mobile device to decrypt the encrypted blob containing the application certificate using a secret key.

23. The method of claim 22, further comprising maintaining the application certificate in a storage of the mobile device in encrypted form.

* * * * *